United States Patent [19]

Price et al.

[11] Patent Number: 4,703,836
[45] Date of Patent: Nov. 3, 1987

[54] SELF-ENERGISING DISC BRAKES WITH LINKS OF DIFFERENT LENGTHS

[75] Inventors: Anthony G. Price; Robert R. Bishop, both of Gwent, Wales; Roy Campbell, Worcestershire, England

[73] Assignee: Lucas Industries, Great Britain

[21] Appl. No.: 823,379

[22] Filed: Jan. 28, 1986

[30] Foreign Application Priority Data

Feb. 7, 1985 [GB] United Kingdom ............... 8503142

[51] Int. Cl.⁴ ..................... F16D 55/04; F16D 55/18
[52] U.S. Cl. ............................. 188/71.4; 192/93 A
[58] Field of Search ............................ 74/106, 38, 520; 188/71.4, 72.2, 72.7, 72.8, 72.9, 70 B, 366; 192/70, 93 A, 83

[56] References Cited

U.S. PATENT DOCUMENTS

| 2,900,051 | 8/1959 | Hillegass | 188/71.4 |
| 3,101,813 | 8/1963 | Parrett | 188/71.4 |
| 3,204,727 | 9/1965 | Wilson et al. | 188/71.4 |
| 3,323,381 | 6/1967 | Jinasena et al. | 74/106 |
| 3,543,886 | 12/1970 | Campbell | 188/71.4 |
| 4,549,636 | 10/1985 | Price et al. | 188/72.2 X |

FOREIGN PATENT DOCUMENTS 913624 12/1962 United Kingdom .

Primary Examiner—Douglas C. Butler
Attorney, Agent, or Firm—Oldham, Oldham & Weber Co.

[57] ABSTRACT

A self-energizing disc brake is disclosed. The brake is applied by moving a pair of pressure plates angularly to cause them to separate and clamp friction discs between themselves and braking faces at opposite ends of a housing. The angular movement of the plates is initiated by a brake-applying mechanism comprising a pair of links of different lengths, which are pivotally connected at their outer ends to respective lugs on the pressure plates, and a pull-rod which is connected to the inner ends of the links through a common pivot and is radially displaceable. This facilitates installations of the brake within asymmetrically arranged housings.

3 Claims, 7 Drawing Figures

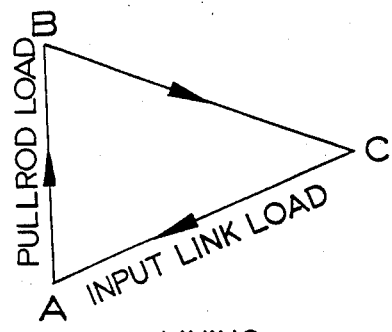
FIG.3. NEW LINING CONDITION.
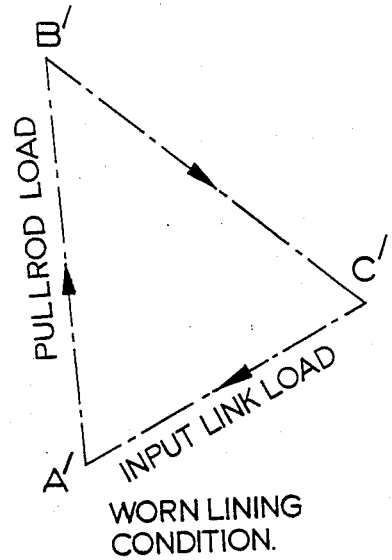
FIG.4. WORN LINING CONDITION.
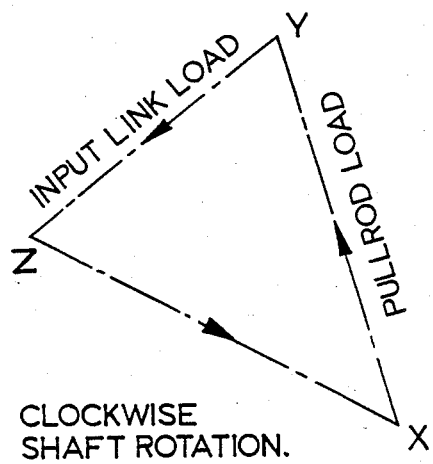
FIG.6. CLOCKWISE SHAFT ROTATION.
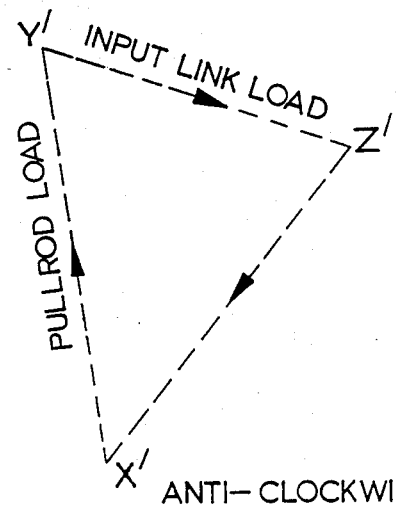
FIG.7. ANTI-CLOCKWISE ROTATION.

SELF-ENERGISING DISC BRAKES WITH LINKS OF DIFFERENT LENGTHS

This invention relates to self-energising disc brakes of the kind in which rotatable friction discs provided with friction linings are adapted to be brought into engagement with spaced opposed radial surfaces in a housing by pressure plates located between the friction discs and centred by stationary pilot lugs, application of the brake being initiated by angular movement of the pressure plates effected by operation of a brake-applying mechanism connected to radially projecting lugs on the plates, and through which a brake-applying force is applied to the plates, balls or rollers being located in co-operating oppositely inclined recesses in the adjacent faces of the pressure plates such that on operation of the brake-applying mechanism to move the pressure plates angularly in opposite directions, the engagement of the balls or rollers and the recesses causes the pressure plates to move apart into engagement with the friction discs which are urged into engagement with the radial surfaces, the pressure plates being carried round with the friction discs until one is arrested by the engagement of a lug on the plate with a drag-taking stop abutment in the housing and the continued angular movement of the other pressure plate provides a servo action.

Self-energising brakes of the kind set forth are commonly used in tractors and like vehicles. It is with the brake-applying mechanism that the invention is principally concerned.

In known brakes of the kind set forth the brake-applying mechanism comprises links which are pivotally connected to the radially projecting lugs on the plates and through which a brake-applying force, for example from a pedal, is applied to the plates when a pull-rod, which is pivotally connected to the links, is moved in a radial direction. The pull-rod may be coupled to a common pivotal connection with the outer ends of both links or, as described in GB No. 913624, the outer end of one link may be pivotally connected to the other link at an intermediate point in its length with the outer end of the said other link pivotally connected, in turn, to the pull-rod.

In known constructions in which the links are substantially equal in length, and the distances between the pivotal connection on the lugs and a common pivotal connection with the pull-rod are substantially equal, the input velocity ratio changes as wear of the friction linings progresses, and it can be shown that the product of pull-rod load and pull-rod travel, "P.V.", remains substantially constant. Specifically the pull-rod load increases significantly as the friction linings wear, but this is accompanied by a corresponding relative reduction in the travel of the pull-rod.

Additionally, in such known constructions of brake, a considerable increase in forward to reverse articulation, between forward and reverse abutment positions, occurs as the friction linings wear. Specifically, as the line of action of the pull-rod deviates even more from being radial, the effect of geometry changes are increasingly measurable at the pedal. A relatively short pull-rod will aggravate this tendency, which may be sensed at the pedal as a movement against the foot when the brake is allowed to articulate from a forward abutment position to a reverse abutment position, or visa versa.

According to our invention, in a self-energising disc brake of the kind set forth the brake-applying mechanism comprises links which are pivotally connected to respective radially projecting lugs on the plates and through which a brake-applying force is applied to the plates when a pull-rod which is pivotally connected to the inner ends of both links through a common pivotal connection is moved in a radial direction, and the distances between the pivotal connections on the lugs and the common pivotal connection with the pullrod are substantially different.

We have found that, in such an arrangement, when the pull-rod is moved radially to apply the brake, substantially along a radius of the brake, the pull-rod loads and the pull-rod travels are similar, irrespective of whether the brake is applied with the friction discs rotating in either a forward or a reverse direction.

This has the advantage that an opening in the housing of the brake and through which the pull-rod projects can be offset circumferentially with respect to a radius of the brake passing through a point which bisects an angle contained between radii passing through the axis of the brake and pivotal connections between the links and the lugs. Thus installation of the brake can be facilitated within asymmetrically arranged housings.

FIG. 3 is a force diagram of the brakeapplying mechanism of FIGS. 1 and 2 with new friction linings;

FIG. 4 is a force diagram similar to FIG. 3 but showing the forces when the friction linings are worn;

FIG. 6 is a force diagram of the mechanism of FIG. 5 for the normal forward direction of disc rotation; and FIG. 7 is a force diagram similar to FIG. 6 for the opposite direction of disc rotation.

Figure 1:
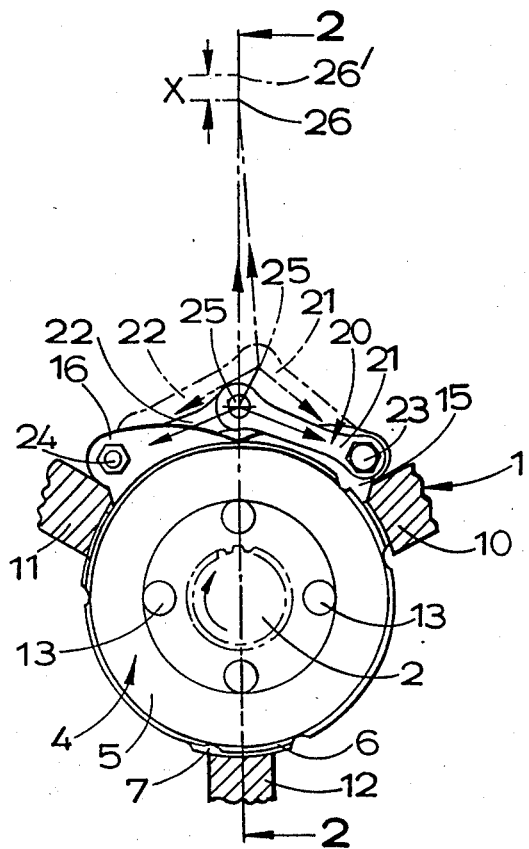
FIG. 1 is a brake of the kind set forth including a known brake-applying mechanism.
Figure 2:
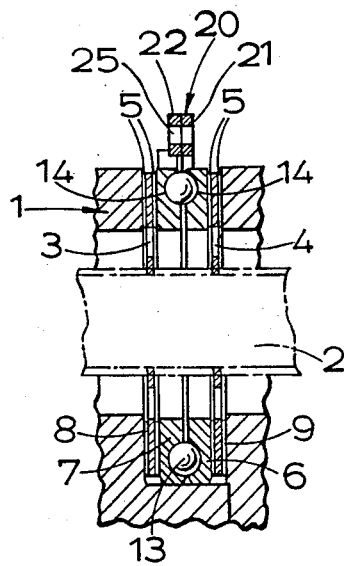
FIG. 2 is a section on the line 2—2 of FIG. 1.

In the known construction of disc brake illustrated in FIGS. 1 and 2 of the drawings a selfenergising brake shown in outline comprises a housing 1 through which a rotatable shaft 2 extends axially. A pair of axially spaced friction discs 3, 4 provided on opposite sides with linings 5 of friction material are slidably splined on the shaft 2. The discs 3, 4 provided on opposite sides with linings 5 of friction material are slidably splined on the shaft 2. The discs 3, 4 are adapted, to be brought into engagement with axially spaced radial braking surfaces 8, 9 at opposite ends of the housing 1 by a pair of annular pressure plates 6 and 7 which are located between the discs and are centred by three stationary pilot lugs 10, 11, 12 on the housing 1. Balls or rollers 13 are located in angularly spaced co-operating oppositely inclined recesses 14 in adjacent faces of the pressure plates 6 and 7.

The application of the brake is initiated by moving the pressure plates 6 and 7 angularly in opposite directions which causes the balls 13 to tend to ride up ramps formed by the walls of recesses 14, and the pressure plates 6, 7 then move apart into engagement with the friction discs 3, 4 to urge them into engagement with the radial surfaces 8, 9 on the housing 1.

When the discs 3, 4 are rotating in one direction, the plates 6 and 7 are carried round with the discs 3, 4 until one plate is arrested by the engagement of a radial lug 15, 16 on that plate with an adjacent face on a drag-taking stop abutment defined by the adjacent end of a respective pilot lug 10, 11. Continued angular movement of the other plate provides a servo-action to increase the braking torque.

When the shaft 2 is rotating in the opposite direction and the brake is applied, the sequence described above is repeated except that the angular movement of the other plate is arrested.

The angular movement of the plates 6 and 7 to apply the brake is initiated by a brake-applying mechanism 20. The mechanism 20 comprises a pair of toggle links 21 and 22 which are symmetrically arranged and are equal in length. The link 21 is pivotally connected at its innermost end to the radial lug 15 on the pressure plate 6 by a connection 23, and the link 22 is pivotally connected at its innermost end to the radial lug 16 on the pressure plate 7 by a pivotal connection 24. The free ends of both links 21 and 22 are pivotally connected between the limbs of a bifurcated fitting by means of a pivot pin 25 and the fitting is coupled to the inner end of a radially movable pull-rod (not shown).

In the application of the brake, a pull applied to the pull-rod in a radial direction is transmitted to both toggle links 21 and 22 to urge the lugs 15 and 16 relatively towards each other in a circumferential direction to effect application of the brake with a self-energising action as described above.

When the shaft 2 is rotating in the clockwise direction shown by the arrow in FIG. 1 of the drawings, the pressure plates 6 and 7 are carried round with the discs 3 and 4 until the plate 6 is arrested by the engagement of the lug 15 with the stop abutment defined by the pilot lug 10.

When the friction linings 5 are new, the links 21 and 22 are substantially in the positions shown in full lines in FIG. 1 with the pull-rod having moved through a distance "x" when the brake is applied. As shown in FIG. 3, the load in the pull-rod is represented by component AB, the load in the link 21 by the component BC, and the load in the link 22 by the component CA.

When the friction linings 5 are worn, the links 21, 22 assume substantially the positions shown in broken lines in FIG. 1 when the brake is applied, with the pull-rod having moved through a distance "x". As shown in FIG. 4, the load in the pull-rod is represented by component A'B', the load in the link 21 by the component B'C', and the load in the link 22 by the component C'A'.

From the force diagrams of FIGS. 3 and 4 which are drawn on similar scales, and the positions of the links 21 and 22 in the positions of new and worn friction linings shown in FIG. 1, it will be seen that the input velocity ratio changes as the friction linings 5 wear.

The force diagrams indicate a significant increase in pull-rod load as the linings 5 wear, but at the same time there is a corresponding reduction in pull-rod travel, namely the difference between the distances 25 and 26 for the new and worn lining conditions of FIG. 1, as the pull-rod is displaced between points 26 and 26'.

Figure 5:
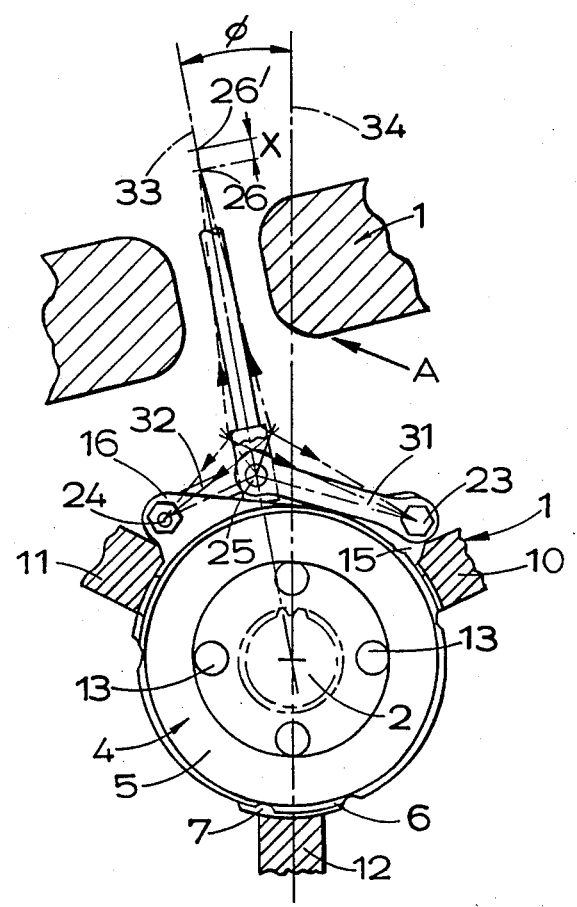
FIG. 5 is an end elevation similar to FIG. 1 but including a new brake-applying mechanism.

In the brake-applying mechanism according to the invention and as shown in FIG. 5 the links 21 and 22 are replaced by links 31 and 32 of longer and shorter lengths, respectively, and the pull-rod coupled to the outer ends of the links 31 and 32 through the pivotal connection 25 lies on a radius 33 which is displaced angularly by an angle $\phi$ from a radius 34 passing through a point, in turn, bisecting an angle contained between radii passing through the axis of the shaft 2 and the pivotal connections 23 and 24 with the lugs 15 and 16.

When the shaft 2 is rotating in a clockwise direction when the brake is applied with the pull-rod being moved from 26 to 26' through distance "x", the forces in the links 31 and 32 and the pull-rod are shown in the force diagram of FIG. 6, with the pullrod load represented by XY, the load in the link 31 by ZX, and the load in the link 32 by YZ.

When the shaft 2 is rotating in a counterclockwise direction, when the brake is applied and the rotation of the plate 7 is arrested by the engagement of the lug 16 with a stop abutment defined by the pilot lug 11, the forces in the links 31 and 32 and the pull-rod are shown in the force diagram of FIG. 7. As illustrated, the load in the pull-rod is represented by X'Y', the load in the link 3 by Y'Z' and the load in the link 32 by Z'X'.

It will be seen from the force diagrams of FIGS. 6 and 7 that similar pull-rod loads occur in both forward and reverse direction of rotation of the shaft 2. This therefore indicates that similar pull-rod travel occurs for both forward and reverse direction of rotation of the shaft 2.

The provision of the links 31 and 32 of different lengths facilitates installation, for example in a housing in which an opening through which the pull-rod projects is spaced circumferentially with respect to an opening lying on the radius 34, of which a part of the housing at one end of the opening is illustrated by arrow 'A'.

The construction of operation of the brake of FIG. 5 is otherwise the same as that of FIGS. 1 and 2, and corresponding reference numerals have been applied to corresponding parts.

We claim:

1. A self-energising disc brake comprising a housing, first and second axially spaced radial surfaces in said housing, radial pilot lugs and a stop abutment in said housing, first and second pressure plates centered on said pilot lugs, a radially projecting lug on each said pressure plate, adjacent faces of said pressure plates being provided with co-operating oppositely inclined angularly spaced recesses, balls or rollers located in complementary pairs of said recesses, a rotatable friction member disposed between each said pressure plate and an adjacent radial surface, each said member comprising a disc, and first and second linings of friction material for engagement with said pressure plate and said radial surface carried by opposite faces of said disc, and brake-applying means for moving said pressure plates angularly relative to said housing to initiate application of said brake with said pressure plates also moving axially to urge the friction member into engagement with said radial surface due to a tendency for said balls or rollers to ride up ramps defined by said end faces, said pressure plates thereafter being carried round with said friction members until one of said plates is arrested by said stop abutment and the continued angular movement of the other of said plates provides a servo action, wherein said brake-applying means comprises first and second links, each having an inner end and an outer end, a pull-rod movable in a radial direction, a first pivotal connection between said outer end of said first link and said radial lug on said first pressure plate, a second pivotal connection between said outer end of said second link and said radial lug on said second pressure plate, and a third common pivotal connection between said inner ends of both said links and said pull-rod, and wherein the distances between said first pivotal connection and said third pivotal connection, and between said second pivotal connection and said third pivotal connection, are substantially different.

2. A brake as claimed in claim 1, wherein said housing has an opening through which said pull-rod extends into said brake, and said opening is offset circumferentially with respect to a radius of the brake passing through a point which bisects an angle contained between radii passing through the axis of the brake and said first and second pivotal connections.

3. A brake as claimed in claim 1, wherein a bifurcated fitting is carried by said pull-rod, and said third pivotal connection acts between said bifurcated fitting and said inner ends of said links.

* * * * *

UNITED STATES PATENT OFFICE
CERTIFICATE OF CORRECTION

Patent No. 4,703,836          Dated November 3, 1987

Inventor(s) Anthony G. Price, Robert R. Bishop, Roy Cambell

It is certified that error appears in the above-identified patent and that said Letters Patent are hereby corrected as shown below:

On the title page, assignee should read

-- [73] Assignee: Lucas Industries a public limited company, Great Britain --.

Signed and Sealed this

Twenty-eighth Day of February, 1989

Attest:

DONALD J. QUIGG

Attesting Officer     Commissioner of Patents and Trademarks